US009734631B2

United States Patent
Katpally Reddy et al.

(10) Patent No.: US 9,734,631 B2
(45) Date of Patent: Aug. 15, 2017

(54) SYSTEMS AND METHODS FOR IMAGE GENERATION AND MODELING OF COMPLEX THREE-DIMENSIONAL OBJECTS

(71) Applicant: Trupik, Inc., Sunnyvale, CA (US)

(72) Inventors: Vikranth Katpally Reddy, Mountain View, CA (US); Sridhar Tirumala, Saratoga, CA (US); Aravind Inumpudi, Fremont, CA (US); David Joseph Harmon, Palo Alto, CA (US); Shivani Pulimamidi, Santa Clara, CA (US)

(73) Assignee: TRUPIK, INC., Sunnyvale, CA (US)

( * ) Notice: Subject to any disclaimer, the term of this patent is extended or adjusted under 35 U.S.C. 154(b) by 0 days.

(21) Appl. No.: 14/848,007

(22) Filed: Sep. 8, 2015

(65) Prior Publication Data
US 2016/0071324 A1   Mar. 10, 2016

Related U.S. Application Data

(60) Provisional application No. 62/047,233, filed on Sep. 8, 2014, provisional application No. 62/054,813, filed on Sep. 24, 2014.

(51) Int. Cl.
| | | |
|---|---|---|
| *G06T 19/00* | (2011.01) | |
| *G06T 7/62* | (2017.01) | |
| *G06T 11/00* | (2006.01) | |
| *G06K 9/00* | (2006.01) | |

(52) U.S. Cl.
CPC ......... *G06T 19/00* (2013.01); *G06K 9/00362* (2013.01); *G06T 7/62* (2017.01); *G06K 9/00268* (2013.01); *G06T 11/00* (2013.01); *G06T 2207/30196* (2013.01); *G06T 2210/16* (2013.01)

(58) Field of Classification Search
None
See application file for complete search history.

(56) References Cited

U.S. PATENT DOCUMENTS

| | | | |
|---|---|---|---|
| 5,850,222 A | 12/1998 | Cone | |
| 6,310,627 B1 * | 10/2001 | Sakaguchi | ............. A41H 3/007 345/630 |
| 7,617,016 B2 | 11/2009 | Wannier et al. | |
| 8,416,236 B1 | 4/2013 | Hickman et al. | |
| 8,514,220 B2 | 8/2013 | Harvill et al. | |
| 8,878,850 B2 | 11/2014 | Harvill et al. | |
| 9,094,670 B1 | 7/2015 | Furio et al. | |
| 2004/0041804 A1 | 3/2004 | Ives et al. | |

(Continued)

FOREIGN PATENT DOCUMENTS

WO    2005104883    11/2015

OTHER PUBLICATIONS

International Patent Application PCT/US2015/049022, International Search Report and Written Opinion, Dec. 22, 2015.
U.S. Appl. No. 14/338,093, filed Jul. 22, 2014, Vikranth Katpally Reddy, et al.

*Primary Examiner* — Jwalant Amin
(74) *Attorney, Agent, or Firm* — Greenberg Traurig, LLP

(57) ABSTRACT

Exemplary embodiments described herein relate to systems and methods for generating an image comprising a three-dimensional ("3D") model or replica of a subject. Such images may include the face of a human subject as well as views of the subject from various angles.

18 Claims, 12 Drawing Sheets

(56) References Cited

U.S. PATENT DOCUMENTS

| | | | |
|---|---|---|---|
| 2004/0227752 A1 | 11/2004 | McCartha et al. | |
| 2007/0198118 A1 | 8/2007 | Lind | |
| 2007/0294142 A1 | 12/2007 | Kattner | |
| 2010/0111370 A1* | 5/2010 | Black | G06K 9/00369 |
| | | | 382/111 |
| 2011/0044521 A1* | 2/2011 | Tewfik | G06K 9/6206 |
| | | | 382/131 |
| 2012/0110828 A1* | 5/2012 | Luisi | A61F 5/05891 |
| | | | 29/592 |
| 2012/0326959 A1* | 12/2012 | Murthi | G06K 9/209 |
| | | | 345/156 |
| 2013/0108121 A1* | 5/2013 | de Jong | G06K 9/00 |
| | | | 382/111 |
| 2013/0151382 A1 | 6/2013 | Fuller | |
| 2013/0201187 A1* | 8/2013 | Tong | G06T 17/00 |
| | | | 345/420 |
| 2013/0215116 A1* | 8/2013 | Siddique | G06Q 30/0643 |
| | | | 345/420 |
| 2013/0245828 A1 | 9/2013 | Tateno et al. | |
| 2013/0266217 A1* | 10/2013 | Gershon | G06F 17/3025 |
| | | | 382/164 |
| 2014/0010449 A1 | 1/2014 | Haaramo et al. | |
| 2014/0176565 A1 | 6/2014 | Adeyoola et al. | |
| 2014/0180647 A1 | 6/2014 | Hodgins et al. | |
| 2014/0180873 A1 | 6/2014 | Rijhwani | |
| 2014/0201023 A1* | 7/2014 | Tang | G06Q 30/0643 |
| | | | 705/26.5 |
| 2014/0310304 A1* | 10/2014 | Bhardwaj | G06F 17/30277 |
| | | | 707/769 |
| 2015/0022550 A1 | 1/2015 | Katpally Reddy et al. | |

* cited by examiner

SYSTEMS AND METHODS FOR IMAGE GENERATION AND MODELING OF COMPLEX THREE-DIMENSIONAL OBJECTS

CROSS-REFERENCE TO RELATED APPLICATIONS

This application claims priority to U.S. Prov. Pat. App. No. 62/047,233, filed Sep. 8, 2014 and entitled "SYSTEMS AND METHODS FOR IMAGE PROCESSING," and to U.S. Prov. Pat. App. No. 62/054,813, filed Sep. 24, 2014 and entitled "SYSTEMS AND METHODS FOR IMAGE PROCESSING," the disclosures of which are hereby incorporated herein by reference.

This application is related to U.S. patent application Ser. No. 14/338,093, filed Jul. 22, 2014 and entitled "SYSTEMS AND METHODS FOR IMAGE PROCESSING," the disclosure of which is hereby incorporated herein by reference.

BACKGROUND

Exemplary embodiments described herein relate to systems and methods for generating an image comprising a three-dimensional ("3D") model or replica of a subject. Such images may include the face of a human subject as well as views of the subject from various angles.

SUMMARY

An exemplary computer-implemented method according to various aspects of the present disclosure comprises: receiving, by an image generation system from a client computing device over a network, data regarding dimensions of a human subject; receiving, by the image generation system from the client computing device over the network, data regarding a garment to be displayed in conjunction with the human subject; generating, by the image generation system and based on the data regarding the dimensions of the human subject and the data regarding the garment, an image that includes a model of the human subject wearing the garment; and transmitting, by the image generation system, the image of the model of the human subject wearing the garment to the client computing device for display on a display screen in communication with the client computing device.

The present disclosure includes various methods, apparatuses (including computer systems) that perform such methods, and computer readable media containing instructions that, when executed by computing systems, cause the computing systems to perform such methods. Other features will be apparent from the accompanying drawings and from the detailed description which follows.

BRIEF DESCRIPTION OF THE DRAWINGS

A more complete understanding of certain embodiments may be derived by referring to the detailed description and claims when considered in connection with the following illustrative figures. While these exemplary embodiments are described in sufficient detail to enable those skilled in the art to practice the disclosure, it should be understood that other embodiments may be realized and that logical and mechanical changes may be made without departing from the spirit and scope of the disclosure.

DETAILED DESCRIPTION OF EXEMPLARY EMBODIMENTS

Figure 1:
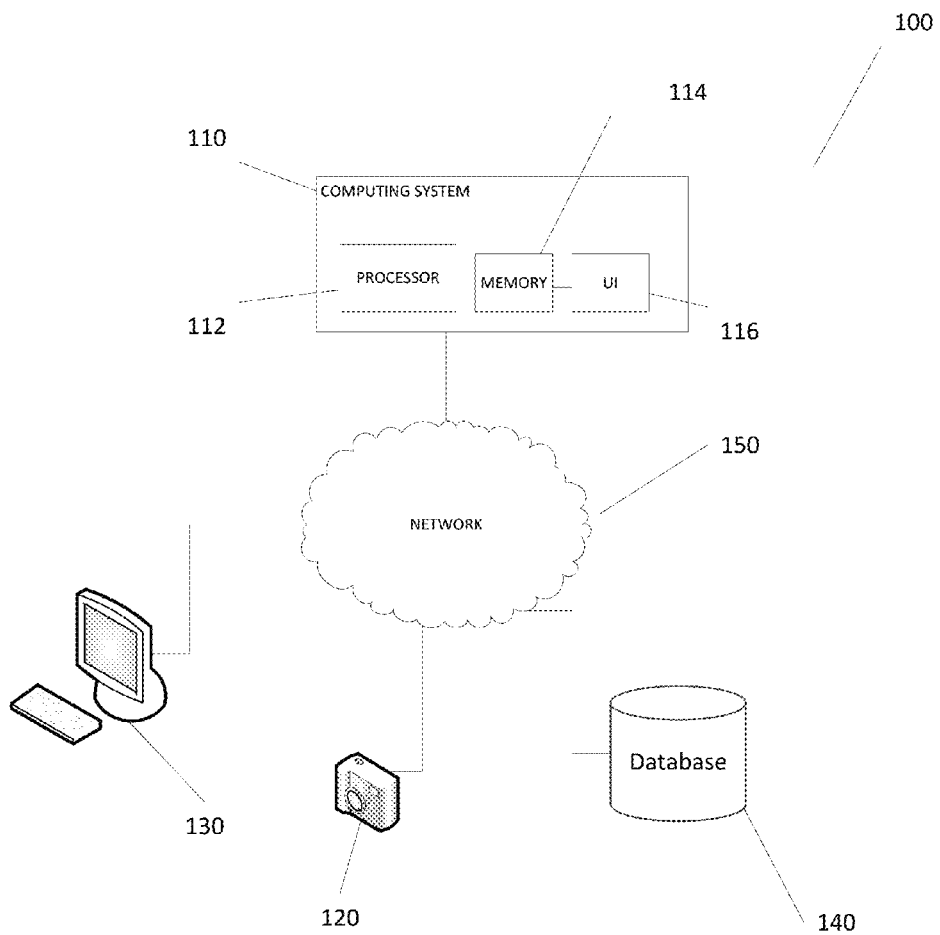
FIG. 1 is a flow diagram showing an exemplary process according to various embodiments.

Embodiments of the present disclosure can be used to generate image replicas and models of complex three-dimensional objects, such as of a person wearing various outfits. Such models may be used to help the person visualize how clothes and accessories will look without actually having to try them on.

Systems, methods and computer program products are provided. In the detailed description herein, references to "various embodiments," "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

Among other things, embodiments of the present disclosure can help take the guesswork out of online shopping by generating, based on actual dimensions, images of a model of a shopper wearing various clothing and accessories. Shoppers are thus able to see pictures of themselves in various outfits before purchasing them, and are able to see how such outfits would look and fit on the specific shopper.

Images can be generated from various angles to provide the person an experience as close as possible to actually wearing the clothes, accessories and looking at themselves in the mirror. Among other things, embodiments of the present disclosure can help remove much of the current uncertainty involved in buying clothing and accessories online. Additionally, images generated by embodiments of the present disclosure can be shared with multiple people (e.g., via email or social media), allowing a user's friends to be involved in the process of buying clothes online in real time or near-real-time.

Embodiments of the present disclosure may be implemented in software and utilize images of a subject from one or more cameras, such as digital 3-dimensional cameras, to generate simulated images showing how various garments, shoes, cosmetics, jewelry, luggage (such as purses and handbags), and other accessories would look on the subject. Embodiments of the present disclosure can be implemented using web-based applications to help facilitate online shopping. In this manner, embodiments of the present disclosure can provide virtual fitting rooms that help users to determine whether or not they will like garments or accessories without having to physically try them on.

In contrast to other systems, embodiments of the present disclosure can determine dimensions and characteristics of a subject without requiring the subject to remove his or her clothing. Additionally, embodiments of the present disclosure can be used to generate images of the a model of the subject's body integrated with actual 3D reconstruction of the subject's face/head, to give a more realistic representation of the subject compared to conventional virtual fitting rooms that simply use a generic "mannequin" face when displaying clothing on the mannequin. As used herein, an "image" may include a still image, a three-dimensional image, multiple images, and/or video.

Any combination and/or subset of the elements of the methods depicted herein may be practiced in any suitable order and in conjunction with any suitable system, device, and/or process. The methods described and depicted herein can be implemented in any suitable manner, such as through software operating on one or more computer systems. The software may comprise computer-readable instructions stored in a tangible computer-readable medium (such as the memory of a computer system) and can be executed by one or more processors to perform the methods of various embodiments.

FIG. 1 is a block diagram of system which may be used in conjunction with various embodiments. While FIG. 1 illustrates various components of a computer system, it is not intended to represent any particular architecture or manner of interconnecting the components. Other systems that have fewer or more components may also be used.

In FIG. 1, the system 100 includes a image generation computer system 110 comprising a processor 112, memory 114, and user interface 116. Image generation system 110 may include any number of different processors, memory components, and user interface components, and may interact with any other desired systems and devices in conjunction with embodiments of the present disclosure.

Figure 11:
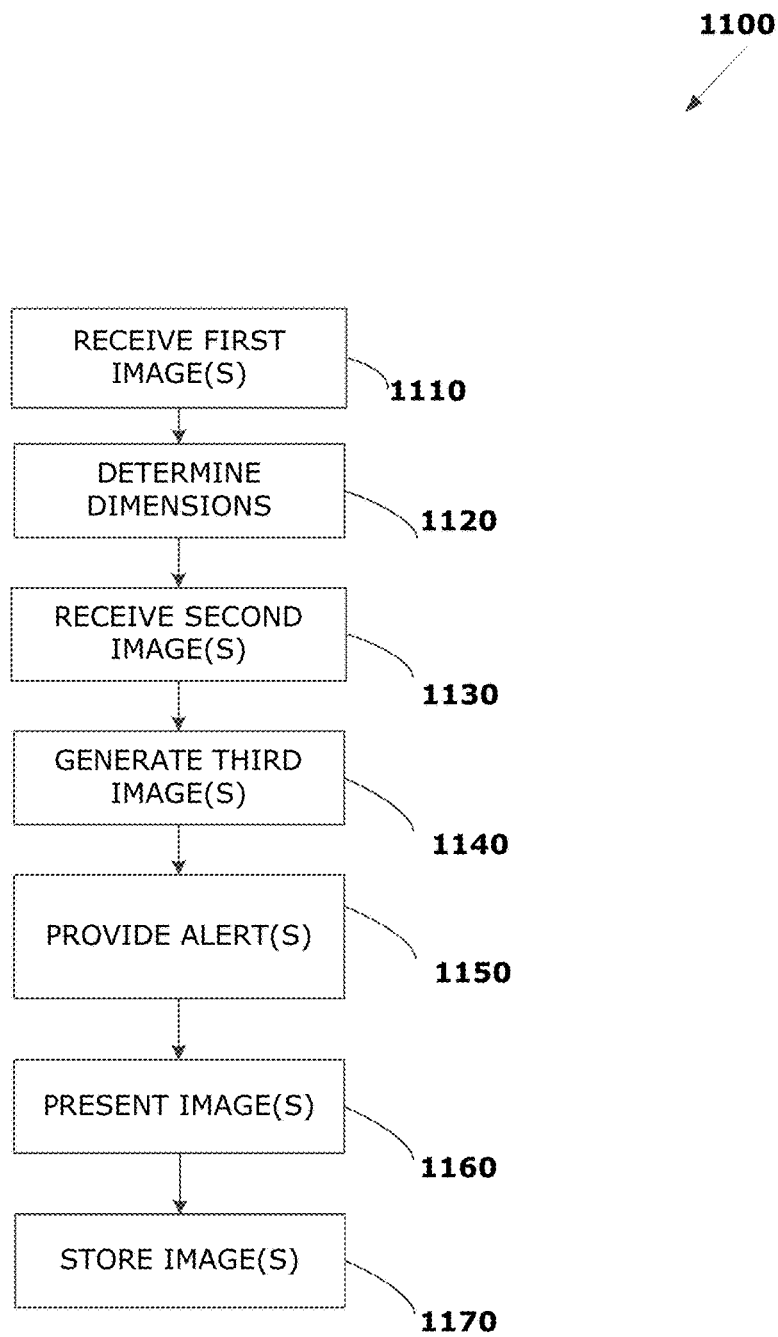
FIG. 11 is a block diagram of an exemplary system according to various embodiments.

The functionality of the computer system 110, including the methods depicted in FIGS. 11 and/or 12, (in whole or in part), may be implemented through the processor 112 executing computer-readable instructions stored in the memory 114 of the system 110. The memory 114 may store any computer-readable instructions and data, including software applications, applets, and embedded operating code.

The functionality of the system 110 or other system and devices operating in conjunction with embodiments of the present disclosure may also be implemented through various hardware components storing machine-readable instructions, such as application-specific integrated circuits (ASICs), field-programmable gate arrays (FPGAs) and/or complex programmable logic devices (CPLDs). Systems according to aspects of certain embodiments may operate in conjunction with any desired combination of software and/or hardware components. The processor 112 retrieves and executes instructions stored in the memory 114 to control the operation of the system 110. Any type of processor, such as an integrated circuit microprocessor, microcontroller, and/or digital signal processor (DSP), can be used in conjunction with embodiments of the present disclosure. A memory 114 operating in conjunction with embodiments of the disclosure may include any combination of different memory storage devices, such as hard drives, random access memory (RAM), read only memory (ROM), FLASH memory, or any other type of volatile and/or nonvolatile memory. Data can be stored in the memory 114 in any desired manner, such as in a relational database.

The system 110 includes a user interface 116, which may include any number of input devices (not shown) to receive commands, data, and other suitable input from a user. The user interface 1116 may also include any number of output devices (not shown) to provides the user with data, notifications, and other information. Typical I/O devices may include mice, keyboards, modems, network interfaces, printers, scanners, video cameras and other devices.

The system 110 may communicate with one or more image creation devices 120 (such as digital cameras and three-dimensional cameras), client computing devices 130, databases 140, graphics processing hardware and/or software (not shown), as well as other systems and devices in any desired manner, including via network 150.

The image-generating system 110, image creation devices 120, and/or client computing devices 130 may be, include, or operate in conjunction with, a laptop computer, a desktop computer, a mobile subscriber communication device, a mobile phone, a personal digital assistant (PDA), a tablet computer, an electronic book or book reader, a digital camera, a video camera, a video game console, and/or any other suitable computing device.

The database 140 may include a relational, hierarchical, graphical, object-oriented structure, and/or any other database configuration. The database 140 may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically.

The various system components may be independently, separately or collectively suitably coupled to the network 150 via data links which includes, for example, a connection to an Internet Service Provider (ISP) over a local loop as is typically used in connection with standard modem communication, cable modem, satellite networks, ISDN, Digital Subscriber Line (DSL), or various wireless communication methods. It is noted that the network may be implemented as other types of networks, such as an interactive television (ITV) network.

The network 150 may include any electronic communications system or method, including any cloud, cloud computing system or electronic communications system or method and may incorporate any suitable hardware and/or software components. Communication among components operating in conjunction with embodiments of the present disclosure may be performed using any suitable communication method, such as, for example, a telephone network, an extranet, an intranet, the Internet, point of interaction device (point of sale device, personal digital assistant (e.g., iPhone®, Palm Pilot®, Blackberry®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Systems and devices of the present disclosure may utilize TCP/IP communications protocols as well as IPX, Appletalk, IP-6, NetBIOS, OSI, any tunneling protocol (e.g. IPsec, SSH), or any number of existing or future protocols.

Figure 12:
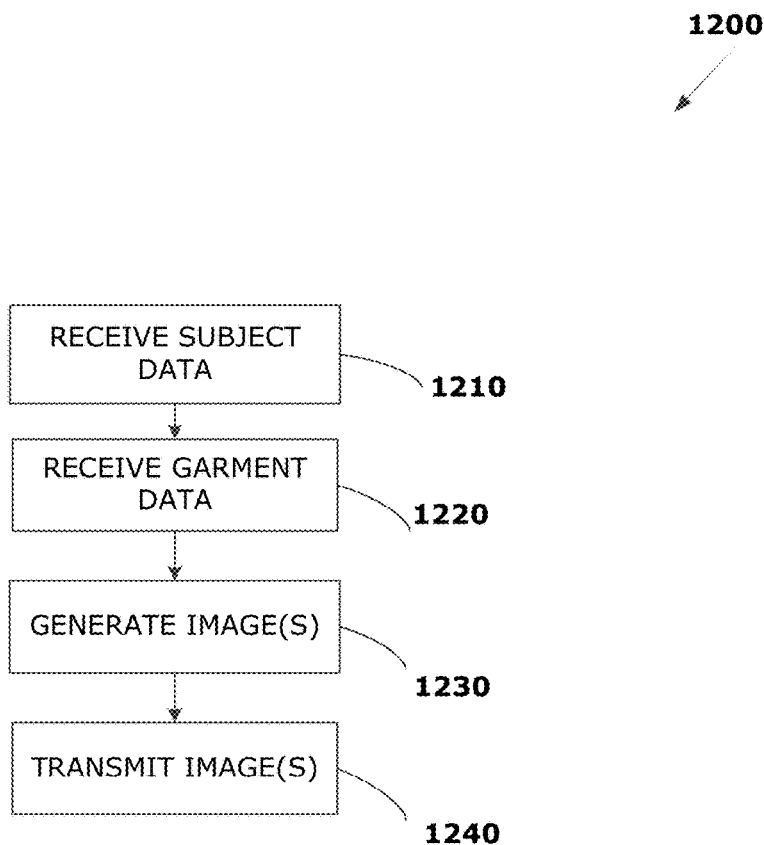
FIG. 12 is a flow diagram showing an exemplary process according to various embodiments.

FIGS. 11 and 12 illustrate exemplary processes according to various aspects of the present disclosure. The exemplary method 1100 in FIG. 11 includes receiving one or more first images of a human subject (1110), determining, based on the first image(s), dimensions of the subject's body (1120), receiving one or more second images (1130), and generating a third image (1140). Method 1100 further includes providing one or more alerts (1150), presenting the third image via a display device (1160), and storing one or more images (1170).

The exemplary method in FIG. 12 includes receiving data regarding a human subject (1210), receiving data regarding a garment to be displayed in conjunction with the human subject (1220), generating an image that includes a model of the human subject wearing the garment (1230), and transmitting the generated image (1240).

Figure 2:
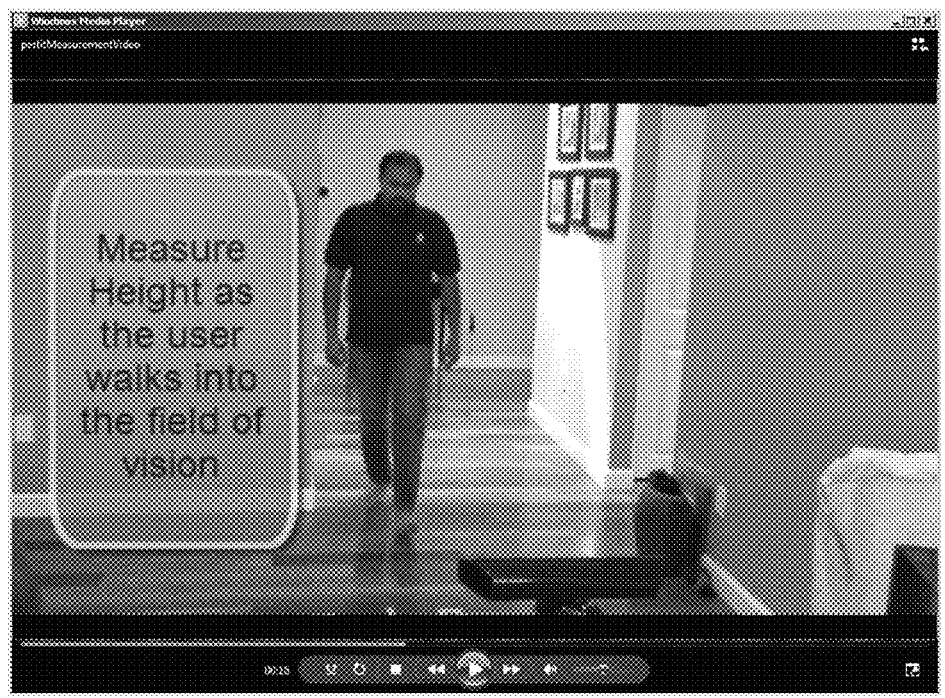
FIGS. 2-10 depict exemplary steps and for capturing images of, and measuring characteristics for, a human subject.

In some exemplary embodiments, software operating on an image-generation computer system (such as system 110 in FIG. 1) is configured to receive one or more first images of a subject (1110) that includes at least a portion of the subject's body. Based on the first set of received images, various characteristics of the subject may be determined (1120), such as the dimensions of the subject's body. Referring to FIG. 2, a subject (in the background) approaches an image generation device, such as a camera (in the foreground) that is in communication with a computer system running an application implementing various aspects of this disclosure. In this example, images from the camera or other image creation device can be used to determine the subject's height.

In the exemplary method 1200 shown in FIG. 12, data regarding a subject may include images of the subject, as well as measurements of at least a portion of the human subject. Portions of the human subject may include, for example, the subject's body, face, chest, waist, hips, arm(s), and/or leg(s). In some embodiments, measurements may be taken and provided as numerical data. In other embodiments, the image generation system 110 may perform image analysis on one or more images from the image creation device 120 to determine dimensions of one or more portions of the human subject. Data regarding the dimensions of a human subject and/or garment may be received from any suitable source. For example, referring to the system 100 in FIG. 1, the data may be received from a client computing device 130, image capturing device 120 and/or database 140 via network 150.

In some embodiments, the image capturing device 120 may be in communication with the client computing device 130, such as a camera embedded in a smartphone. The client computing device 130 may also receive images from a separate image creation device 120 via network 150 and provide such images to the image generation system 110 via network 150.

The subject may be scanned by any image creation device 120 that provides information on color and relative distance (depth) of the subject to the image creation device. Using the image from the image creation device, body components of the user can be estimated by the image generation system. For example, the image may be analyzed to identify one or more features of the human subject, such as the texture of the subject's skin, a geometrical measurement associated with the subject (e.g., related to the subject's face or body), and/or a color of the subject's skin. Analysis of the image may be used in conjunction with other data regarding the subject's dimensions (such as measurements of the subject) and the garment(s) to be displayed with the subject's model. Data regarding the garment may also include data regarding shoes, cosmetics, jewelry, luggage (such as purses and handbags), and other accessories. Data for any portion of the subject may be received (1210), including data for the subject's body and face. In some embodiments, a pre-existing constrained model of a typical human body can be deformed/modified to match the dimensions determined by the image generation system and generate the image (1230) of the model of the subject based on the received data for the subject.

Referring now to FIG. 3-6, the subject stands in front of the camera in various poses to provide one or more second images to the computer system (130). In some embodiments, the subject need only pose in front of the camera for about ten seconds in order to provide the necessary images. Based on the images captured for the subject, the manner in which a garment worn by the subject may be analyzed to estimate the characteristics of the material of the garment. A default garment may then be draped on a deformable model of a typical human body. The volumetric deformation of the constrained human body can be applied until the draping of the actual subject matches the draping over the variable human body.

In some exemplary embodiments, the model of the human subject may have specific attributes of geometry and color used for various purposes, such as being used in a personalized closet and online shopping. Multiple models of the subject (i.e., displaying different combinations of garments) can be provided to the user/subject in real-time or near-real-time. Such images may also display different combinations of shoes, cosmetics, jewelry, luggage (such as purses and handbags), and other accessories in conjunction with garments.

Figure 3:

In FIG. 3, characteristics of the subject are determined from the image of the subject along with error correction factors. In some embodiments, the position of the camera relative to the subject may be taken into consideration in generating error correction factors and/or other aspects of the image of the subject's body. In the example shown in FIG. 3, the error correction factors may be determined based on the manner in which the subject's clothing interfaces with the subject's armpits or other portions of the subject's body. Such factors may be applied to the generated image of the subject's body to help provide a more accurate representation of the subject.

Figure 4:
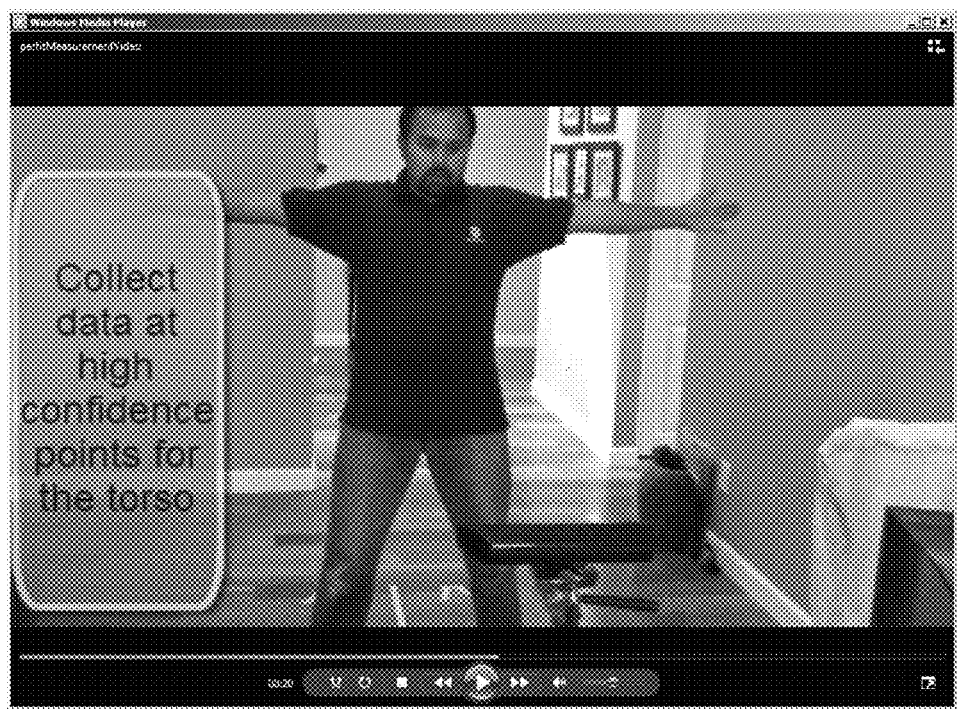
Figure 5:
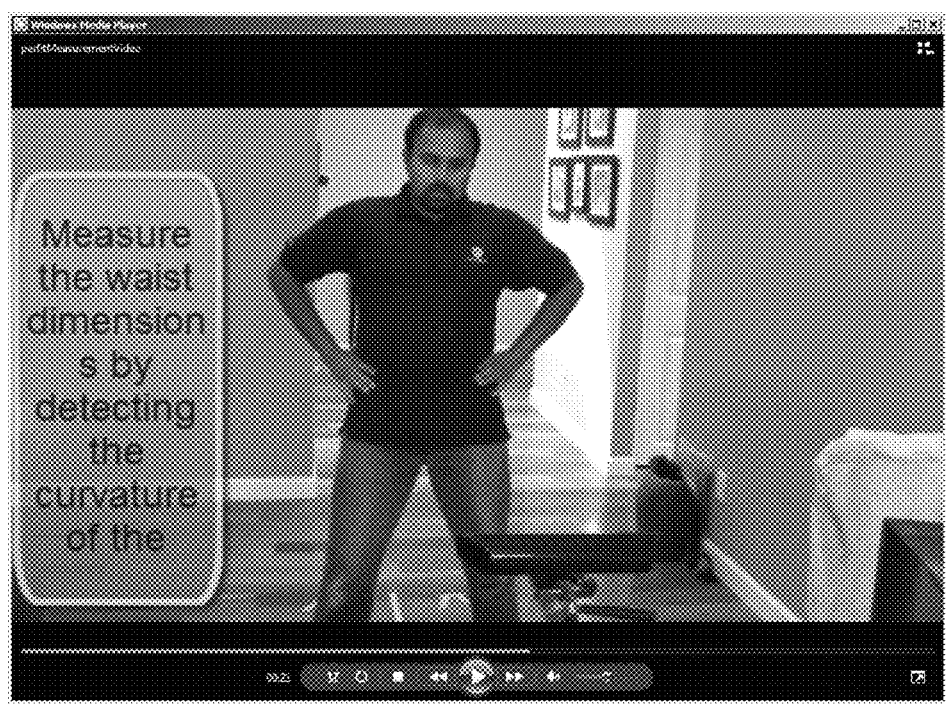
Figure 6:
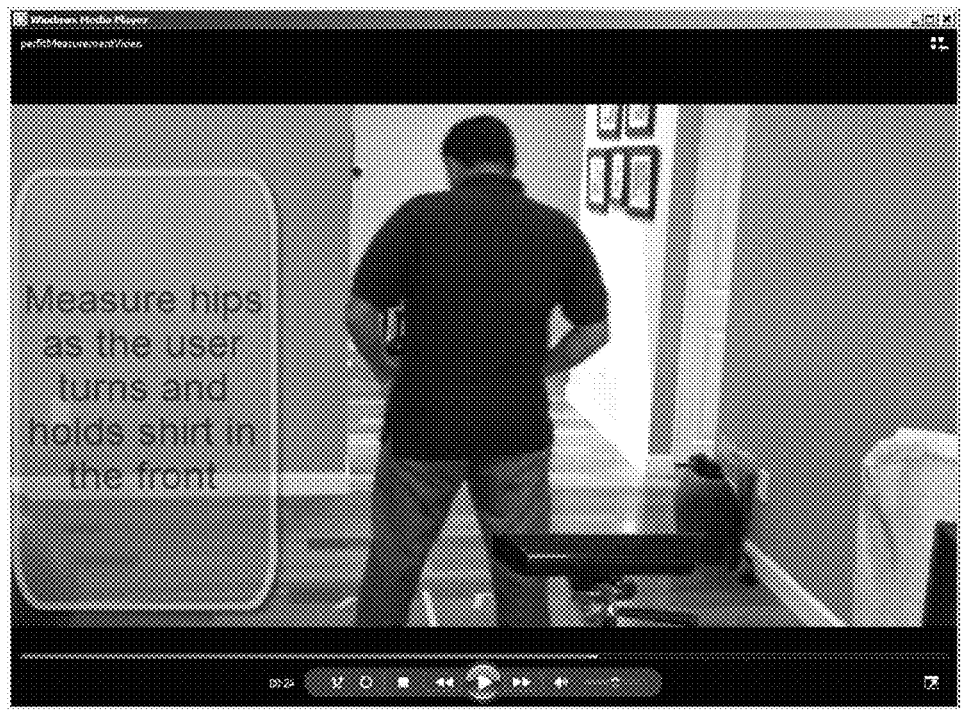
Figure 7:
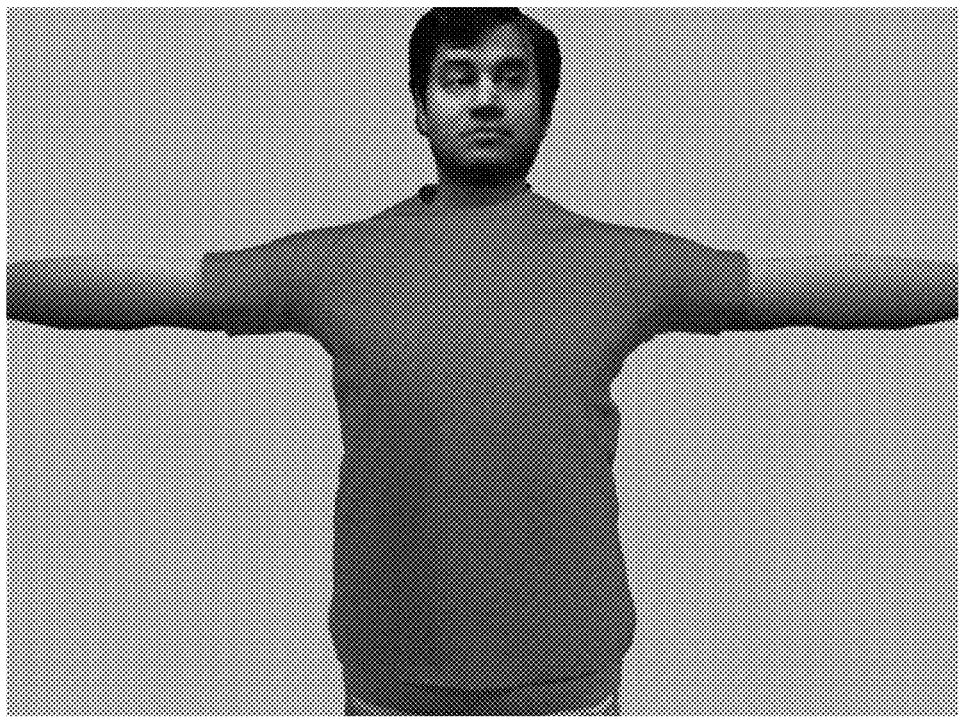
Figure 8:
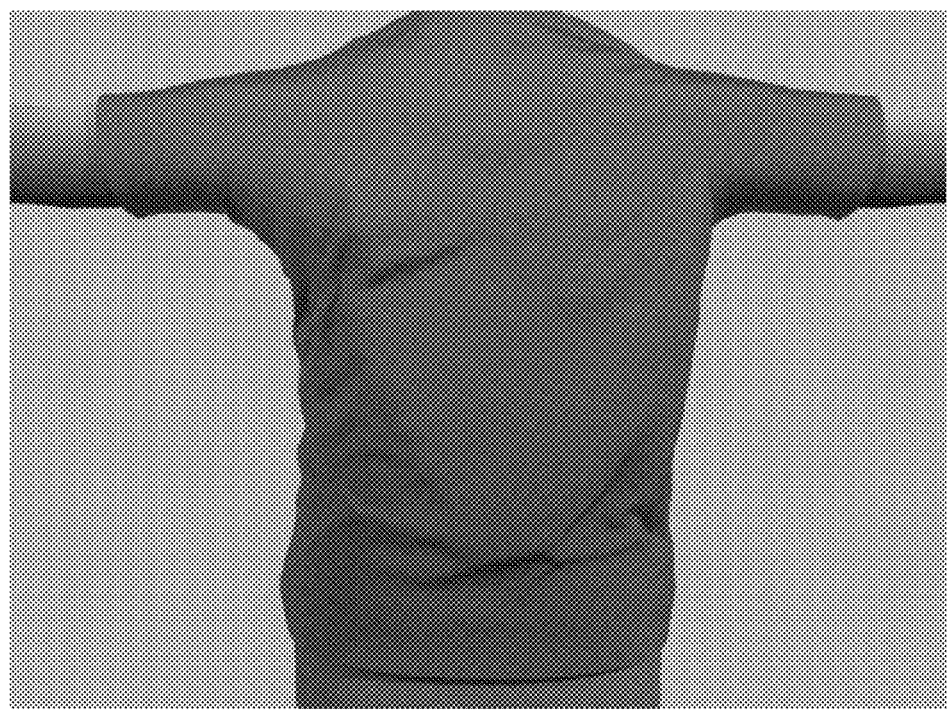
Figure 9:
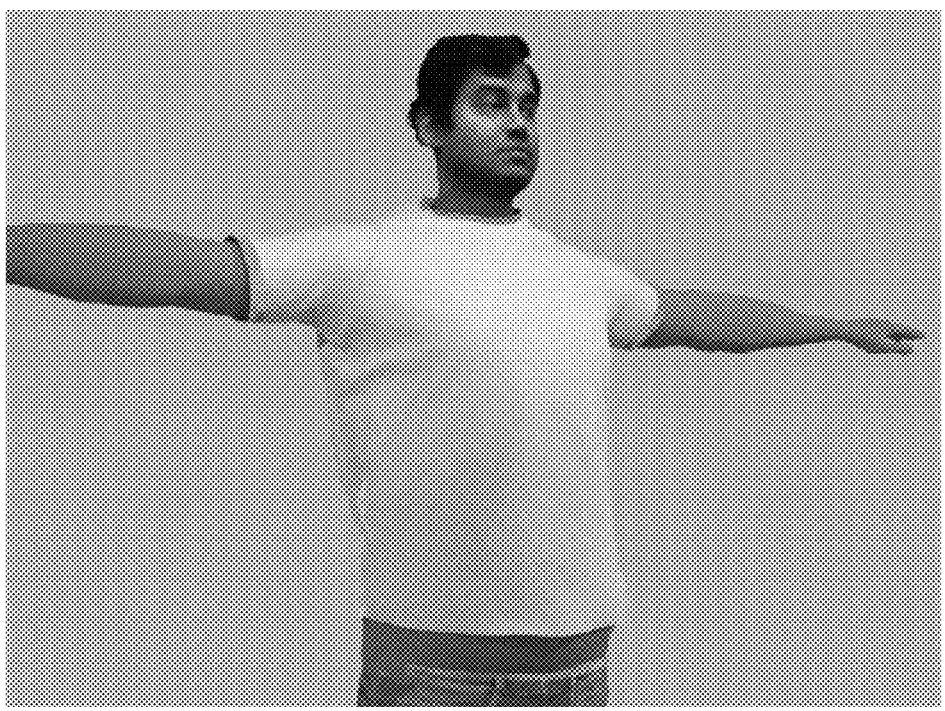
Figure 10:

As shown in FIG. 4, characteristics of the subject's body may be determined with reference to a confidence level associated with the determined characteristic. For example, portions of the subject's body that are determined to be covered in baggy clothing may have a relatively low confidence level, where portions of the subject's body where the clothing is tight-fitting (e.g., along the upper arms of the subject in FIG. 4) may have a relatively higher confidence level. Any desired characteristic of the subject, such as the size of the subject's waist (FIG. 5) and hips (FIG. 6) may be determined. Embodiments of the present disclosure may use data from the determined characteristics to generate an image of the subject's body as described in more detail below.

In the exemplary method 1100 in FIG. 11, a third image of the subject's body may be generated (1140) to show the subject from different angles (e.g., front, back, partial side, etc.) to allow the subject to see different aspects of the clothing or accessories he or she might purchase. Likewise, in the exemplary method in FIG. 12, an image of the model of the human subject wearing a garment may be generated (1230). Generating an image of the subject's body based on the determined dimensions may include adjusting the image of the subject's body based on a known gender for the subject, as well as other factors (e.g., age, height). Portions of the subject's body, particularly those obscured by clothing in the received images, may be determined by generating various shapes such as curves, ellipses, parabolas, cardoids, and other shapes for representing at least a portion of the subject's body. Such shapes may be selected based on the portion of the body being generated, or based on any other suitable factors. Examples of generated images for the front and back of a subject are shown in FIGS. 7-10, which demonstrate the extraction of body dimensions by exposing parts of the human body using specific poses.

In some embodiments, multiple images of the subject may be received (1210). For example, the plurality of images may include images of the subject in different poses, such as facing forward, to either side, and back relative to one or more image creation devices 120. rotations in front of the camera. In some embodiments, multiple images of the subject can be captured as the subject rotates, thereby exposing various parts of the subject's body and allowing dimensions and metrics for the subject's body and face to be determined by the image generation system 110. Similarly, multiple images of the subject may be received from multiple image creation devices located in different positions relative to each other. Accordingly, though FIG. 1 illustrates a single image creation device 120, any number of different image creation devices may be used in conjunction with embodiments of the present disclosure.

Determining the dimensions of a subject and/or a garment from analysis of one or more images may be performed in stages. For example, height and measurements in the chest, waist, hips and legs region of a subject can be extracted from images of the subject's first rotation in front of a camera. In the second rotation, the magnitude of movement of the garment due to motion is used to compute the looseness of the garments on the subject.

Generation of the image of the model of the subject (1230) may include extracting one or more three-dimensional meshes from an image. Such meshes may also be stored (e.g., in the memory 114 of image generation system 110 and/or in database 140). In many cases, the data measured from such images may include data that is corrupt/meaningless, often referred to as "noise." Embodiments of the present disclosure can eliminate such noise from the data by subjecting the data of the extracted three-dimensional mesh to a narrow range of depth limits established to conform to a typical human body. Points falling outside these bounds are eliminated, thus helping to reduce the noise associated with the data.

Generation of images by embodiments of the present disclosure may also include registering the three-dimensional meshes extracted from images using an iterative closest point algorithm. The registered meshes represent a geometric likeness of the measured subject with the garment, upon which generation of the image may be based.

The garment data received (1220) by the image generation system may include an image of a garment to be displayed on the model of the human subject. This may be the same (or a different) image from which the data on the human subject is determined. In one embodiment, the thickness of the garments on the measured subject are identified from the received image and classified. Any desired classifications may be used, such as "fine," "coarse," and "thick," and the image of the model of the subject wearing the garment may be generated based on such classification.

To generate the image of the model of the subject, embodiments of the present disclosure may use a model of a morphable typical human body as a baseline. Based on the dimensions of the actual subject derived from the received data fro the subject, the morphable model is modified to correspond to the actual subject. For a human subject, modification of various portions of the model may include the modification of the model's: Upper Arm circumference, upper arm length, lower arm circumference, lower arm length, upper body length, lower body length, chest circumference, waist circumference, breast dimensions, weight and tone, and/or other characteristics. The model can be dressed with a selected garment using the thickness of the garment described above.

Generation of the image of the model of the subject may be computed on a step basis. The dimension of the step is tunable as an input to the algorithm. The image of the model can be generated by iteratively modifying geometric likeness of a portion of the human subject by minimizing a least mean squared based energy function in each iteration until the cost function goes below a sufficiently small different (or "delta") from the registered mesh.

Features of a subject's face may be extracted from the yaw range of −180 to +180 degrees captured within 90 image frames. Each of the frames may be aligned to each other using Iterative Closest Point (ICP). All the frames may be overlapped to create a single enclosed face shape. The energy function, defined as the volumetric difference between a deformable sphere and fixed face shape, can be minimized. At the minimal value of the energy function, any protrusions of the face shape beyond the sphere, may be considered as a feature. These features can be extracted from the corresponding frames and transferred to the sphere. A final Poisson surface construction can be performed to create a look-alike of the consumer's body and face.

Images capturing the subject's face preferably maintain a pitch and roll of the subject's face within a narrow angle of 7.5 degrees. Noise reduction and mesh registration may be performed for the subject's face as described above. Generation of the human subject's face for the model may be performed by deforming a spherical mesh, where the curvature in the deformed spherical mesh is determined using a direct application of the second derivative. The regions of interest on the spherical mesh may be identified by delimiting the curvature within a range. Once the high curvature regions are identified, point data from the registered mesh (described above) in can be used to supplement the deformed mesh. The points can be directly appended by using a straightforward "collapse" of the visible meshes. The resulting consolidated cloud of points can be meshed employing, for example, an algorithm for the Poisson creation of surfaces. The Poisson surface reconstruction creates surfaces from oriented point sets.

Color can be post processed to get variations and effects that span the spectrum of a monochromatic likeness to a photo realistic likeness. The surfaces of the model of the subject and the garment can be based on the original subject's texture as determined from the image(s) received by the image generation system. In this manner, embodiments of the present disclosure can provide a given model with a coloring that is true to the color in the received image (i.e., photo realistic) or that uses any other desired coloring/shading.

In one exemplary embodiment, the original color of a surface of the subject and/or the garment is transferred from the image received from the image capture device using a Euclidean distance based metric. This transferred color can be post-processed in a variety of different ways. For example, the color can be post-processed by creating a "marble" like effect of the original coloring by processing the original R, G and B values from the RGB color-space to be within a very small range of each other.

In another example, the transferred color can be post-processed using a representative hue (h), saturation (s) and brightness (b) values extracted from a patch of skin under the eye. The patch of skin under the eye has been selected as this is one portion that is prone to be exposed and not have any hair. The average values are computed for h, s and b in this area and uniformly applied over the face and or body. Among other things, such coloring schemes help address the issue of maintaining the subject's privacy while maintaining a high degree of personalization.

Embodiments of the present disclosure can thus generate a composite image that includes a generated image of the subject's body (based on the determined dimensions of the subject's body) coupled with an actual image of the subject's head. The image of the subject's head may be taken from the same images used to determine the characteristics of the subject's body, or based on other images. In one embodiment, the user may sit in a chair and perform a 360-degree rotation in front of a three-dimensional camera to provide the image of the subject's head.

Generation of the composite body/head image may include merging the image of the subject's body and the image of the subject's head using a uniform morphing technique between a lower portion of the subject's head (e.g., the subject's chin) and an upper portion of the subject's body (e.g., the subject's chest).

Embodiments of the disclosure can also help enhance the likeness of the model to the actual subject by accentuating geometric features of the subject's face and body. A range of colors may be applied to the image of the model of the subject to help solve issues of privacy while still maintaining a high degree of personalization in the model of the human subject.

In one embodiment, generating the composite image includes applying a color gradient present on the subject's head in the received images to a portion of the third image where the image of the subject's body and the image of the subject's head interface (e.g., the neck area). In one embodiment, a color gradient under the eyes of the subject is used along the neck area to help seamlessly blend the actual image of the subject's head with the generated image of the subject's body.

The model of the human subject may include multiple recreations of the subjects face and/or body to provide a model of the subject that has an actual likeness to the subject. As described in more detail below, embodiments of the present disclosure can track features of the subject to texture to draw a likeness parallel. Images containing a model of the human subject may provide a likeness of consumer both in the geometrical measurements of the subject's face and body as well as the likeness of the subject with regards to the texture and color of the subject's skin and the garment(s) displayed in conjunction with the model.

In addition to displaying garments using the generated image (model) of the subject's body, embodiments of the present disclosure may also use the determined characteristics of a subject to identify and suggest a particular garment or accessory (e.g., that might fit the subject's body particularly well). Images may display the model of the subject wearing single garments as well as combination of garments.

Additionally, combinations of garments can be selected or eliminated for display to a user based on factors such as the user's buying habits. For example, garments that match a preference of the user/subject and garments already owned/previously purchased by the user may be automatically displayed for the user. Likewise, combinations of garments that are complimentary with respect to color and style may be selected, while combinations that are inappropriate/unflattering may be automatically eliminated and not shown to the user.

In some embodiments, an alert (e.g., visual and/or audible) can be provided (1150) if it is determined that a size of garment selected by the user is not likely to fit the subject, based on the determined dimensions of the subject.

Once the model of the human subject is created, the same model can be utilized to display different garments. Accordingly, a plurality of images may be generated, with each displaying a model of the human subject wearing a different combination of garments. In one embodiment, a user may identify and store various garments for display from a virtual closet or wardrobe. Such garments may include garments the user already owns and garments the user may wish to purchase. Images of existing (pre-owned) garments may be identified by the user from, for example, an online catalog of items as well as based on an image of the garment submitted by the user.

Many different combinations for a given selection of individual garments can be provided by using proximity of hue variations. In order to reduce the number of possible combinations, combinations of garments may be automatically eliminated (and thus not shown to the user) based on the types of garments. For example, garments of the same type (such as two different pairs of pants) could be excluded from a possible combination/outfit. Likewise, garments that match a user's preference may be included while garments that do not could be excluded. Combinations may also be provided/excluded based on the user's purchase history (i.e., garments previously purchased by the user could be favored for presentation over those that have not). Colors that compliment or conflict may be considered in displaying combinations (e.g., colors adjacent on the color wheel may be excluded from combinations for outfits), and the size of garments may also be considered (e.g., garments in sizes that are either too small or too large based on measured body dimensions of the user/subject may be eliminated).

In order to render the image of the model wearing a garment in real-time or near-real-time, one or more techniques may be used to expedite creation of the image. For example, there may be many different styles for a shirt. However, the difference between various styles of shirt might be minimal. All the styles of the shirt can be represented using a single representative shirt. The key difference between the representative shirt and any actual shirt would be in type of pocket, different shapes of the buttons, so on and so forth.

Accordingly, an image of a model of the user/subject wearing the representative garment (e.g., shirt) for the plurality of garments can be generated and one or more features of the representative garment (e.g., pocket, button, color, etc.) modified to correspond to a particular garment from a plurality of possible garments.

The representative garment can be draped on the model of the subject/user prior the creation of the user's virtual wardrobe/closet, and characteristics of the draping of the representative shirt are stored. These characteristics may include, for example, the folding of the garment on different parts of the body, since the location of the folds on the garment is computationally expensive. The pre-calculated fold information (and other characteristics) can be transferred to the draping of the actual shirt much faster than computing such characteristics in real-time. When the user issues a request to display the shirt (or other garment) as part of the user's virtual wardrobe, the representative shirt can be quickly modified to match the actual shirt by including the characteristics for the actual shirt.

Models of the human subject/user can be displayed in various poses (sitting, standing with front view, standing with side view, 360 degree view) appropriate to the garment being visualized.

In this manner, embodiments of the present disclosure can use the characteristics determined for the subject to encourage purchases the subject will appreciate, as well as to warn the subject if he/she is about to purchase an item the subject is unlikely to be happy with. This can not only increase revenues and customer satisfaction, but also reduce returns and negative feedback from consumers. Embodiments of the disclosure can provide a potentially unlimited set of models of the subject displaying combinations of garments already owned by the subject as well as garments the subject may wish to buy.

Embodiments of the present disclosure may also help facilitate and expedite purchases of various garments by users. For example, the user's virtual wardrobe/closet, preferences, buying history, and other information can be provided to various retailers. The user may purchase a garment using an exemplary software application providing various features of the present disclosure, and the user can have the garment delivered to his/her home or can pick the garment up at a store. In such cases, the store manager (or other entity) can review the user's preferences, purchase history, etc., and suggest additional products/garments/accessories for the user based on the user's purchase.

In today's world with most of the data moving through mobile devices, data minimization has become an essential component. Specifically, in the garment industry, the amount of data is very high owing to high volume of images. Extensive data transfer occurs through applications on various devices, like IPHONES and ANDROID devices and the like.

Embodiments of the present disclosure may be used to help address the huge data transfer between consumers and retailers, as well as the lack of personal interaction between the two. In one exemplary embodiment, a model of the human subject/user is stored on the user's mobile device (e.g., client computing device 130) and transmitting the image of the subject wearing a garment (1240) includes transmitting unit size pattern information for the garment and an area of the garment for which the unit size pattern is repeatedly displayed.

Any color/pattern is an appropriate combination of red (R), green (G) and blue (B) colors. When the retailer store would like to send any specific garment information to their consumers, they would send the RGB unit size combination for each pixel corresponding to the user's screen resolution for their client computing device (e.g., a smartphone or other mobile device).

The unit size is defined by the smallest size which when repeated creates the entire pattern for the garment. This unit size, in turn, is defined by the pixels, where each pixel is defined as a combination of RGB with the origin located at the lower left corner of the unit cell. The unit cell is always forced to be a square. The number of times the unit cell is repeated, both in x and y direction, along the surface of the draped garment, results in definition of the pattern for the entire garment, or at least a given area of the garment. Any physical discontinuity in the garment, for example, pockets, plackets and collars may be treated as continuous objects when the unit cell is repeated to cover the entire garment.

Utilization of the unit size pattern avoids having to transmit an entire (large) image of a garment, and can reduce the amount of data transfer for solid colored garments by up to 95% while the amount of data required to represent non solid color patterns can be reduced by up to 70%. Such reductions in the data transfer between a retail store and consumer is particularly useful when the user is using a mobile computing device that may have bandwidth restrictions and/or limits on the speed or availability of data transfer based on the user's subscriber contract. Additionally, this embodiment helps enhance the personalized image transfer between store manager and the consumer.

Any of the images captured from an image creation device (such as the first or second images) as well as images generated by the system (e.g., the third composite image or the image of the model of the human subject wearing a garment) may be presented (1160) to a user in any desired manner, such as via a display device in communication with the system generating the third image. For example, any image (such as the images in FIGS. 7-10 showing a user wearing a garment for potential purchase) may be transmitted (1240) to a user's client computing device 130 (such as an IPHONE or ANDROID device) in real-time or near-real-time over network 150 for display on a display screen in communication with the client computing device 130, including the integrated display of a smartphone as well as external display devices. The system may also store (1170) any images received or generated in a database in communication with the system for later retrieval and use.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and one or more databases (e.g., storing images of various clothing items and accessories and/or images of users).

Computer systems operating in conjunction with embodiments of the present disclosure may include an operating system (e.g., Windows OS2, UNIX, Linux, Solaris, MacOS, etc.) as well as various conventional support software and drivers typically associated with computers.

Various functionality may be performed via a web browser and/or application interfacing utilizing a web browser. Such browser applications may comprise Internet browsing software installed within a computer system to perform various functions. Any number and type of computing device or system may be used in conjunction with embodiments of the present disclosure, including laptops, notebooks, tablets, hand held computers, personal digital assistants, cellular phones, smart phones, set-top boxes, workstations, computer-servers, main frame computers, mini-computers, PC servers, pervasive computers, network sets of computers, personal computers and tablet computers, such as iPads, iMACs, and MacBooks, kiosks, terminals, point of sale (POS) devices and/or terminals, televisions, or any other device capable of receiving data over a network. Various embodiments may utilize Microsoft Internet Explorer, Mozilla Firefox, Google Chrome, Apple Safari, or any other of the myriad software packages available for browsing the internet.

The system may be partially or fully implemented using cloud computing. "Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand.

Various embodiments may be used in conjunction with web services, utility computing, pervasive and individualized computing, security and identity solutions, autonomic computing, cloud computing, commodity computing, mobility and wireless solutions, open source, biometrics, grid computing and/or mesh computing.

Any databases, systems, devices, servers or other components of the system may consist of any combination thereof at a single location or at multiple locations, wherein each database or system includes any of various suitable security features, such as firewalls, access codes, encryption, decryption, compression, decompression, and/or the like.

Encryption may be performed by way of any of the techniques now available in the art or which may become available—e.g., Twofish, RSA, El Gamal, Schorr signature, DSA, PGP, PKI, and symmetric and asymmetric cryptosystems.

The computers discussed herein may provide a suitable website or other Internet-based graphical user interface which is accessible by users. For example, the Microsoft Internet Information Server (IIS), Microsoft Transaction Server (MTS), and Microsoft SQL Server, may be used in conjunction with the Microsoft operating system, Microsoft NT web server software, a Microsoft SQL Server database system, and a Microsoft Commerce Server. Additionally, components such as Access or Microsoft SQL Server, Oracle, Sybase, Informix MySQL, Interbase, etc., may be used to provide an Active Data Object (ADO) compliant database management system. In another example, an Apache web server can be used in conjunction with a Linux operating system, a MySQL database, and the Perl, PHP, and/or Python programming languages.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, Java applets, JavaScript, active server pages (ASP), common gateway interface scripts (CGI), extensible markup language (XML), dynamic HTML, cascading style sheets (CSS), AJAX (Asynchronous Javascript And XML), helper applications, plug-ins, and the like. A server may include a web service that receives a request from a web server, the request including a URL and an IP address. The web server retrieves the appropriate web pages and sends the data or applications for the web pages to the IP address. Web services are applications that are capable of interacting with other applications over a communications means, such as the Internet.

Various embodiments may employ any desired number of methods for displaying data within a browser-based document. For example, data may be represented as standard text or within a fixed list, scrollable list, drop-down list, editable text field, fixed text field, pop-up window, and the like. Likewise, embodiments may utilize any desired number of methods for modifying data in a web page such as, for example, free text entry using a keyboard, selection of menu items, check boxes, option boxes, and the like.

The exemplary systems and methods illustrated herein may be described in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, Java, JavaScript, VBScript, Macromedia Cold Fusion, COBOL, Microsoft Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JavaScript, VBScript or the like.

Embodiments of the present disclosure may be embodied as a customization of an existing system, an add-on product, a processing apparatus executing upgraded software, a stand alone system, a distributed system, a method, a data processing system, a device for data processing, and/or a computer program product. Accordingly, embodiments of the present disclosure may be implemented using a processing apparatus executing code, an internet based embodiment, an entirely hardware embodiment, and/or combinations thereof. Furthermore, embodiments of the present disclosure may include a computer program product on a computer-readable storage medium having computer-readable program code embodied in the storage medium. Any suitable computer-readable storage medium may be utilized, including hard disks, CD-ROM, optical storage devices, magnetic storage devices, and/or the like.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" should be construed to exclude only those types of transitory computer-readable media which were found in *In Re Nuijten* to fall outside the scope of patentable subject matter under 35 U.S.C. §101.

No claim element herein is to be construed under the provisions of 35 U.S.C. 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

Where a phrase similar to "at least one of A, B, or C," "at least one of A, B, and C," "one or more A, B, or C," or "one or more of A, B, and C" is used, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Changes and modifications may be made to the disclosed embodiments without departing from the scope of the present disclosure. These and other changes or modifications are intended to be included within the scope of the present disclosure, as expressed in the following claims.

What is claimed is:

1. A computer-implemented method comprising:
receiving, by an image generation system from a client computing device over a network, data regarding dimensions of a human subject;
receiving, by the image generation system from the client computing device over the network, data regarding a garment to be displayed in conjunction with the human subject;
generating, by the image generation system and based on the data regarding the dimensions of the human subject and the data regarding the garment, an image that includes a model of the human subject wearing the garment; and
transmitting, by the image generation system, the image of the model of the human subject wearing the garment to the client computing device for display on a display screen in communication with the client computing device,
wherein the data regarding the dimensions of the human subject include an image received from an image creation device in communication with the client computing device, and the data regarding the garment includes an image of the garment from an image creation device, wherein generating the image includes analyzing the image of the garment to classify a thickness of the garment and generating the image based on the classified thickness of the garment.

2. The method of claim 1, wherein the data regarding the dimensions of the human subject includes an image of the human subject from an image creation device, and wherein generating the image includes:
analyzing the image of the human subject to identify a feature of the human subject including one or more of: a texture of the human subject's skin, a geometrical measurement associated with the human subject, and a color of the human subject's skin; and
generating the image of the model of the human subject based on the identified feature.

3. The method of claim 1, wherein one or more of the data regarding the dimensions of the human subject and the data regarding the garment includes a plurality of images received from a plurality of image creation devices in communication with the client computing device, wherein the plurality of image creation devices are located in different positions relative to each other.

4. The method of claim 1, wherein the data regarding the dimensions of the human subject includes an image of the human subject from an image creation device, and wherein generating the image includes:
extracting a three-dimensional mesh from the image received from the image creation device; and
eliminating noise in the image by applying a depth limit associated with a typical human body to the three-dimensional mesh to remove data points outside the depth limit.

5. The method of claim 1, wherein generating the image includes:
extracting a three-dimensional mesh from the image received from the image creation device;
registering the three-dimensional mesh using an iterative closest point algorithm; and
generating the image of the model of the human subject based on the registered three-dimensional mesh representing a geometric likeness of the human subject wearing the garment.

6. The method of claim 5, wherein generating the image includes iteratively modifying the geometric likeness of a portion of the human subject by minimizing a least mean squared based energy function in each iteration until a cost function falls below a predetermined difference from the registered three-dimensional mesh.

7. The method of claim 6, wherein the portion of the human subject is a face of the human subject.

8. The method of claim 7, wherein the likeness of the face of the human subject is generated by deforming a spherical mesh, and wherein a curvature in the deformed spherical mesh is determined using a direct application of a second derivative.

9. The method of claim 8, wherein the likeness of the face of the human subject is generated by identifying a region of interest in the deformed spherical mesh by delimiting the curvature of the deformed spherical mesh within a range and supplementing the deformed spherical mesh using point data from the registered three-dimensional mesh.

10. The method of claim 9, wherein a surface of the likeness of the face of the human subject is generated by employing a Poisson surface creation algorithm using the point data from the registered three-dimensional mesh.

11. The method of claim 1, wherein generating the image includes applying a color to a feature in the generated image by:
identifying a color of the feature in the image received from the image capture device using a Euclidean distance based metric; and
modifying the identified color based on representative values for hue, saturation, and brightness selected for the feature.

12. The method of claim 1, wherein the data regarding the dimensions of the human subject includes measurements of at least a portion of the human subject.

13. The method of claim 1, wherein the data regarding the garment includes an identification of a plurality of different garments for display in the generated image, and wherein the image generation system generates a plurality of images, each of the plurality of images displaying a model of the human subject wearing a different combination of the plurality of different garments.

14. The method of claim 13, wherein generating the plurality of images includes generating, by the image generation system, combinations of the plurality of garments based on one or more of: garments that are of different types, garments that match a preference of a user of the client computing device, garments previously purchased by a user of the client computing device, colors of the garments, and sizes of the garments.

15. The method of claim 13, wherein generating the plurality of images includes generating an image of the model of the human subject wearing a representative garment and modifying a feature of the representative garment to correspond to a garment from the plurality of garments.

16. The method of claim 1, wherein the model of the human subject is stored on the client computing device and transmitting the image of the model of the human subject wearing the garment includes transmitting unit size pattern information for the garment and an area of the garment for which the unit size pattern is repeatedly displayed.

17. A tangible, non-transitory, computer-readable medium storing instructions that, when executed by an image generation system, cause the image generation system to:
- receive, from a client computing device over a network, data regarding dimensions of a human subject;
- receive, from the client computing device over the network, data regarding a garment to be displayed in conjunction with the human subject;
- generate, based on the data regarding the dimensions of the human subject and the data regarding the garment, an image that includes a model of the human subject wearing the garment; and
- transmit the image of the model of the human subject wearing the garment to the client computing device for display on a display screen in communication with the client computing device,
- wherein the data regarding the dimensions of the human subject include an image received from an image creation device in communication with the client computing device, and the data regarding the garment includes an image of the garment from an image creation device, wherein generating the image includes analyzing the image of the garment to classify a thickness of the garment and generating the image based on the classified thickness of the garment.

18. An image generation system comprising:
a processor; and
memory in communication with the processor and storing instructions that, when executed by the processor, cause the image generation system to:
- receive, from a client computing device over a network, data regarding dimensions of a human subject;
- receive, from the client computing device over the network, data regarding a garment to be displayed in conjunction with the human subject;
- generate, based on the data regarding the dimensions of the human subject and the data regarding the garment, an image that includes a model of the human subject wearing the garment; and
- transmit the image of the model of the human subject wearing the garment to the client computing device for display on a display screen in communication with the client computing device,
- wherein the data regarding the dimensions of the human subject include an image received from an image creation device in communication with the client computing device, and the data regarding the garment includes an image of the garment from an image creation device, wherein generating the image includes analyzing the image of the garment to classify a thickness of the garment and generating the image based on the classified thickness of the garment.

* * * * *